United States Patent

[11] 3,607,292

[72] Inventor Edward J. Cerwonka
Binghamton, N.Y.
[21] Appl. No. 845,519
[22] Filed July 28, 1969
[45] Patented Sept. 21, 1971
[73] Assignee GAF Corporation
New York, N.Y.

[54] TRIACRYLYLDIETHYLENETRIAMINE, METHOD OF PRODUCING THE SAME, AND PHOTOPOLYMERIZATION PROCESS AND SYSTEM UTILIZING THE SAME
9 Claims, No Drawings

[52] U.S. Cl. ........ 96/115 P, 96/35.1
[51] Int. Cl. ........ G03c 5/00, G03c 1/68
[50] Field of Search ........ 96/115, 115 P, 35.1

[56] References Cited
UNITED STATES PATENTS
2,610,120 9/1952 Minsk et al. ........ 96/115

*Primary Examiner*—Norman G. Torchin
*Assistant Examiner*—Edward C. Kimlin
*Attorneys*—Samson B. Leavitt, Walter G. Hensel and Walter C. Kehm

ABSTRACT: A new monomer triacrylyldiethylenetriamine is prepared by the reaction of diethylenetriamine acryloyl chloride and sodium hydroxide, the reaction yielding the desired monomer, sodium chloride and water. The monomer, triacrylyldiethylenetriamine, is useful in the photopolymerization process as high-speed polymerizable monomer in conjunction with a colloidal carrier and a light-sensitive ferric salt. Modification of the reactants in the above process allow for the production of polyacryly1 and polymethacrylyl polyethylene polyamines containing 2 to 4 ethylene groups.

TRIACRYLYLDIETHYLENETRIAMINE, METHOD OF PRODUCING THE SAME, AND PHOTOPOLYMERIZATION PROCESS AND SYSTEM UTILIZING THE SAME

The present invention is directed to a novel polyacrylyl polyethylene polyamine monomer, a method of synthesizing and purifying the same, and the use of such monomer in a photopoly merization process and product; more particularly, the present invention is directed to the novel monomer, triacrylyldiethylene triamine, its method of synthesis and the use of such material in a high-speed photographic process.

A photoreproduction process based on photopolymerization generally displays a relatively low photographic speed, i.e., a photographic speed which is roughly in the magnitude of silver halide contact printing paper. While this is generally the case with respect to photoreproduction processes based on photopolymerization, there have been a number of suggestions by which the photographic speed of such processes can be increased. Thus, for example, one such suggestion relates to the incorporation of a reducing agent such as sodium bisulfite into the photopolymerizable layer, thereby yielding a composition of higher photographic speed. While such a procedure works to some extent, it must be pointed out that the introduction of an additional material, i.e., a reducing agent, complicates the system thereby making reproducibility more difficult. A further suggested route to obtaining higher speed reproduction in a photoreproduction process based on photopolymerization is related to the choice of the monomer employed in the photo polymerizable layer or coating. Thus, for example, recent re ports have indicated that the photographic speed of a photo polymerizable composition can be controlled to a certain extent by proper selection of the type and concentration of the monomeric material incorporated into the photopolymerizable coating or layer.

In this regard, it was found through some investigation that the use of a more highly water-soluble monomer had an effect on the photographic speed since more of this monomer could be embodied in the coated photopolymerizable layer. On the other hand, however, it is hypothesized that solubility alone may not explain the effect of the monomer on the photographic speed since structural features of the molecule may also have an undetermined effect. Accordingly, within this environment there have been many attempts to produce a still more rapidly polymerizable mono mer for use in photopolymerization processes. This has now been accomplished in accordance with the present invention.

Thus, in accordance with the present invention it has been discovered that the novel compound N,'N''-triacrylyldi ethylenetriamine, a very water-soluble trifunctional monomer, is extremely effective for the rapid photographic reproduction in a photopolymerization process.

Accordingly, it is a principal object of the present invention to provide a novel photopolymerizable monomer which, due to its structure and physical characteristics is capable of increasing the photographic speed in a photopolymerization process It is a further object of the present invention to provide such a monomer comprising the compound N,N'''-triacrylyl diethylenetriamine.

A still further object of the present invention comprises a method for producing such trifunctional monomer and similar monomeric materials by a process comprising the reaction of an alkylene polyamine and acryloyl or methacrylyl chloride.

Yet a further object of the present invention comprises the provision of a photopolymerization process and photo polymerization composition wherein the monomer employed for the production of a rapid photographic speed comprises N,N'''-triacrylyldiethylenetriamine and related polyfunctional compounds.

Still further objects of the novel compound, process, and composition of the present invention will become more apparent from the following more detailed description thereof.

As indicated above, the present invention is directed to certain novel polyacrylyl and polymethacrylyl polyethylene polyamines, particularly triacrylyldiethylenetriamine, the method of synthesizing such novel compounds, as well as the utilization of the same in a photopolymerization process whereby photographic speeds are increased.

Again, the principal monomer of the present invention comprises N,N',N''-triacrylyldiethylenetriamine, such material corresponding to the formula:

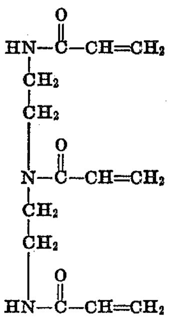

Such a monomeric material, particularly suited for increasing the photographic speed in a photopolymerization process, is prepared in accordance with the present invention by the reaction of diethylenetriamine with acryloyl chloride. Such a reaction producing the desired triacrylyldiethylenetriamine can be represented as follows:

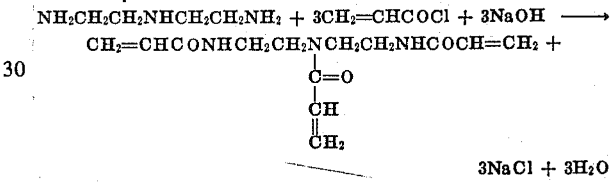

With respect to the preparation of triacrylyldiethylene triamine, it is pointed out that since this product is very soluble in water and easily polymerized by heat as well as by acidic or alkaline conditions, the treatments necessary in the preparation, isolation, and purification of such compound must be controlled so as to prevent undesired prepolymerization of the monomeric material. Accordingly, the following is a description of a method for the synthesis, isolation and purification of this monomeric material as well as other closely related organic compounds.

As indicated in the above equation representing the preparation of triacrylyldiethylenetriamine, the reaction takes place by admixing diethylenetriamine, acryloyl chloride and sodium hydroxide in a mol ratio of approximately 1:3:3:. Such a reaction yields the desired triacrylyldiethylenetriamine, sodium chloride and water.

Although the reaction takes place between the diethylene triamine and approximately 3 mols of acryloyl chloride for each mol of the diethylenetriamine it is, of course, obvious that greater amounts of the acid chloride can be employed in the system in order to assure complete reaction and complete production of the triacrylyl substituted product. In this regard, therefore, the use of excess acryloyl chloride over the amount specified above does not adversely affect the system but only provides for the additional removal of this reactant in excess of that necessary to react with the triamine starting material.

Similarly, the sodium hydroxide or caustic soda should be present in the system in an amount stoichiometrically equivalent to the amount of acid chloride present. Here again, as noted above, it is preferred in accordance with the present invention to react the triethylenetriamine with the acryloyl chloride in the presence of approximately 3 mols of sodium hydroxide per mol of amine. Again, however, slight excesses in the amount of sodium hydroxide necessary to initiate the reaction of the triamine and acid chloride can be varied slightly from the above noted amount.

The reaction of the triamine, i.e., diethylenetriamine, and acryloyl chloride in the presence of sodium hydroxide is conducted in accordance with the present invention at a fairly low temperature, somewhere in the order of -10°C. to 40°C. Preferably, ably, the process of the present invention is carried out at a temperature of from about 0°–10°C. by the dropwise addition of acryloyl chloride and sodium hydroxide to the diethylenetriamine. The process of the present invention is carried out at such low temperatures in order to avoid any premature polymerization of the water-soluble monomer produced in accordance with the present invention.

Generally, the dropwise addition of caustic and the acid chloride is carried out over a period of several hours, generally from about 1 hour to about 6 hours. It is, of course, obvious, however, that the time for the addition of the caustic and acryloyl chloride is not a critical parameter in accordance with the process of the present invention, it only being necessary that there be sufficient contact for reaction of the triamine and acid chloride in the presence of sodium hydroxide. Again, this is preferably accomplished by the dropwise simultaneous addition of the acryloyl chloride and sodium hydroxide to the triamine starting material.

Additionally, while the process of the present invention can be carried out in the absence of solvents it is sometimes preferable to carry out the reaction of the amine and acid chloride with each of the reactants dissolved in a suitable inorganic or organic solvent. Thus, the amine and acid chloride reactants employed in accordance with the process of the present invention can be dissolved in any suitable solvent capable of forming a homogeneous system in which the reaction can effectively take place. For the amine reactant, water has been found to be the solvent of choice. However, the acid chloride, e.g. acryloyl chloride, can be advantageously dissolved in a number of non reactive organic solvents, including among others methylene chloride, benzene, and anhydrous ethyl ether.

After the dropwise addition of the acid chloride and sodium hydroxide under the low temperature conditions as before described, a reaction product is produced which generally comprises a viscous solution. The desired monomeric material is isolated from the viscous reaction solution by treating same with acetone or a similar precipitating agent thereby causing precipitation of the product in the form of a stiff white gum, the gummy precipitate representing a mixture of organic and inorganic reaction products. Filtration techniques are generally not required since the gummy reaction product precipitated as above adheres to the walls of the vessel in which such product is precipitated thereby allowing removal of the liquid byproduct, i.e., supernatant acetone-water system, any solvent used, etc. by decantation.

The solid product produced by elimination of the solvents, etc. from the gummy reaction product which is produced by the process as described above can be isolated and subsequently purified by dissolving the desired triacrylyldiethylenetriamine in a suitable alcoholic or similar solvent capable of dissolving the reaction product. Thus, for example, by adding ethanol to the gummy solid product the organic reaction product will be dissolved leaving behind a residue of powdery sodium chloride. The alcoholic solution that is produced contains the desired triacrylyldiethylenetriamine and minor amounts of byproducts of the instantly disclosed reaction. Such byproducts may include, for example, small quantities of the hydrochlorides of diacrylyldiethylenetriamine, monoacrylyldiethylenetriamine, and the hydrochloride of diethylenetriamine itself.

In order to further isolate the desired product, i.e., triacrylyldiethylenetriamine, the ethanol is evaporated from the solution under reduced pressure. Reduced pressure conditions are utilized in the removal of the ethanol solvent in order to avoid prepolymerization which would occur if the temperature was raised during evaporation. Accordingly, in evaporating the ethanol solvent the temperature is maintained below about 50°C.

The product resulting from such alcohol extraction of the reaction product is generally a semisolid jellylike mass containing the desired triacrylyldiethylenetriamine.

This jellylike residue containing the desired triacrylyl diethylenetriamine is then successively treated with an anion exchange resin and a cation exchange resin. Thus, for example, the jellylike residue containing the desired product is dissolved in deionized water and successively treated with portions of an anion exchange resin by stirring the resin in the aqueous solution. The treatment of the aqueous solution of the desired product with an anion exchange resin is generally conducted until successive *p*H measurements indicate that the *p*H of the solution has remained constant. In this connection, it is possible that the *p*H may level off in the basic region due to the presence of unreacted and partially acrylated diethylene triamine.

For purposes of the present invention, such treatment of the aqueous solution of the residue of alcohol extraction of the reaction product can be conducted with any conventionally utilized anion exchange resin of the strong base type. Thus, for example, exemplary anion exchange resins suitably employed in accordance with the process of the present invention include:

Dowex 1×8, Dowex 21k (Dow Chemical Corporation)
Duolite A–101, Diamond Alkali Company.

It is well known that chemically the anion exchange resin of the strong base type is a quaternary ammonium salt of a polymer derived from polystyrene and divinyl benzene. A particularly suitable anion exchange resin has been found to be Amberlite IRA–401, a product of Rohm and Haas, the anion exchange resin having been previously converted to the OH form by treatment with sodium hydroxide.

After treatment of the aqueous solution of the jelly like residue of alcohol extraction of the reaction product with an anion exchange resin, the aqueous solution is then treated with successive portions of a cation exchange resin. The cation exchange resin is selected from the group known as the strong acid type. Chemically, the resin is a polymer derived from poly styrene and divinyl benzene, with sulfonic acid groups furnishing the hydrogen ion. Amberlite IR–120 (Rohm & Haas) and Dowex 50×8 (Dow) are examples. Here again, treatment of the aqueous solution with the cation exchange resin is preferably accomplished by merely stirring portions of the resin in the aqueous solution. Such treatment of the aqueous solution with a cation exchange resin is generally conducted until the *p* H of the aqueous solution is substantially neutral, i.e., about 6–8. The aqueous solution of the product is now free from chlorides, acrylate ions, and free amine. In this regard, the treatment of the aqueous solution of the jellylike product of the alcohol extraction of the reaction product with the anion exchange resin serves to remove chloride and acrylate ions while treatment of the anion exchange resin-treated aqueous solution with the cation exchange resin serves to remove any free amine. It has been found in accordance with the present invention that such treatment of the aqueous solution of product with an anion and cation exchange resin should be conducted as rapidly as possible, i.e., within a few minutes, since if the aqueous solution or product is allowed to stand for any prolonged period of time at an elevated *p*H, i.e., a *p*H of 9 or above, polymerization soon begins, as shown by the appearance of turbidity in the aqueous solution. The customary procedure of allowing the solution to percolate through a column of resin is unsatisfactory. Polymerization of the compound occurs before the solution is recovered from the column.

The desired triacrylyldiethylenetriamine product can then be removed from the aqueous solution by conventional means, again making sure that the temperature does not exceed about 50°C. since above this temperature the monomer readily polymerizes. Thus, for example, some of the water can be removed by evaporating the aqueous solution under reduced pressure, the reduced pressure allowing the evaporation to take place at a temperature not in excess of 50°C. Thus, in this manner the volume of the aqueous solution can be substantially reduced. In addition, the solution can be filtered. In this connection, when a suitable precipitant such as acetone is added to the aqueous filtrate a white precipitate is formed, the precipitate comprising the desired triacrylyldiethylenetriamine. To even further purify the precipitated product, the precipitate can be again dissolved in a suitable solvent, e.g. alcohol, and refiltered. Evaporation to dryness again under reduced pressure conditions allows for the recovery of a substantially pure product. The product of such a procedure is the desired N,N′,N″-triacrylyl diethylenetriamine.

Accordingly, the process of the present invention can be summarized as comprising the following steps:

A. Reacting diethylenetriamine and acryloyl chloride in the presence of sodium hydroxide to produce N,N′″-triacrylyl diethylenetriamine, sodium chloride, and water, the molar ratio of the reactants being approximately 1:3:3:.

B. Precipitating the reaction product in the form of a gummy precipitate containing a mixture of organic and inorganic reaction products by use of a precipitating agent, e.g. acetone.

C. Dissolving the organic product out of the gummy precipitate by an alcoholic, e.g. ethanol solvent, leaving behind the inorganic product, i.e., sodium chloride.

D. Treating an aqueous solution of the jellylike residue from the alcohol extraction with an anion exchange resin until a constant *p*H is achieved.

E. Treating an aqueous solution of the anion exchange resin-treated product with a cation exchange resin until a substantially neutral *p*H is achieved.

F. Thereafter extracting the desired products from an aqueous solution of the same through conventional evaporation, filtration, and reprecipitation techniques, being sure that the temperature does not exceed about 50°C.

While the above-described general procedure for preparing the novel monomer of the present invention has been described primarily with respect to the production of N,N′,N″triacrylyldiethylenetriamine, acrylyl-diethylenetriamine, it is, of course, obvious that the same procedure can be suitably employed in the production of similar polyacrylyl polyethylene polyamines. Thus, for example, in lieu of diethylenetriamine as employed in the production of triacrylyldiethylenetriamine other amines such as triethylene, tetraethylene pentaamine, pentaethylene hexaamine, and 1,2,3triaminopropane can be advantageously utilized. The use of such polyamines in reaction with acryloyl chloride, the molar ratio of acryloyl chloride to polyamine corresponding to the number of amino groups capable of reacting with the acid chloride, will result in such related compounds as N,N′,N″,N′″- -tetraacrylyltriethylenetetraamine, N,N′,N″N′″, N″″-pentaacrylyl tetraethylenepentaamine, and N,N′,N″-triacrylyl 1,2,3 propane triamine.

Similarly, in lieu of acryloyl chloride, the acid chloride employed in accordance with the process of the present invention can comprise the related methacrylyl chloride. In such case, the reaction product will be a polymethacrylyl polyethylene polyamine. In this connection, in the production of the preferred compounds or monomers in accordance with the present invention utilizing diethylenetriamine as the monomer the product N,N′,N″-trimethacrylyldiethylenetriamine will be produced when methacrylyl chloride is substituted for acryloyl chloride.

Accordingly, it should be clear from the above that the process of the present invention is a general one directed to a new method of preparing or synthesizing, isolating and purifying a polyacrylyl or methacrylyl polyethylene polyamine. It is to be noted, however, that the process as disclosed is particularly advantageous in preparing and isolating the novel monomer of the present invention, triacrylyl-diethylenetriamine.

As indicated previously, it has been discovered in accordance with the present invention that the monomer triacrylyldiethylenetriamine is effective in increasing the speed of a photo polymerizable process. Thus, it has been found in accordance with the present invention that such novel monomer is capable of rapid photopolymerization both in response to relatively low intensity radiation and in conventionally employed high intensity radiation. Accordingly, the novel monomer, triacrylyldiethylene triamine is a particularly advantageous material in photopolymerizable methods and compositions.

A photopolymerizable composition or method in which the novel monomer of the present invention is particularly adapted is one which involves the conjoint use of the monomer, e.g., triacrylyldiethylenetriamine, and a radiation-sensitive ferric compound applied as a coating on film, paper, metal or a similar base, preferably in combination with a colloidal or similar carrier. The photopolymerization process is carried out by exposing such a composition to visible light, thereby yielding a quantity of ferrous ions depending on the intensity of the exposure. Subsequent passage of the coatings through an aqueous solution of a per-compound, i.e., a peroxide, persulfate, per-carbonate, etc. produced, after washout of unexposed areas, a relief type of polymer.

Again, while it has been previously proposed to increase the speed of the photopolymerization process by including within the above-described composition various speed-increasing additives, it has been found in accordance with the present invention that the speed of photopolymerization can be increased merely by employing the novel monomer, triacrylyl-diethylenetriamine.

The radiation-sensitive ferric compounds utilizable in our system are those described for example in U.S. Pats. Nos. 3,101,270 and 3,183,094. Examples of such compounds are ferric acetate, ferric ammonium acetate (brown), ferric ammonium citrate (green), ferric ammonium oxalate, ferric ammonium sulfate, ferric ammonium tartrate, ferric bromide, ferric chloride, ferric citrate, ferric formate, ferric glycerol phosphate, ferric hydroxide, ferric nitrate, ferric phosphate, ferric potassium citrate, ferric potassium tartrate, ferric pyrophosphate, ferric sodium oxalate, ferric subsulfate, ferric sulfate, ferric succinate and the like.

As indicated above, the polymerization of the monomer is effected by a source of free radicals, preferably a per-compound containing the grouping -O-O-. Examples of such per-compounds advantageously employed in with the composition and method of the present invention include such as: hydroperoxides such as hydrogen peroxide, aliphatic hydroperoxides, i.e., methyl hydroperoxide, ethyl hydroperoxide, t-butyl-hydro-peroxide, hexyl hydroperoxide, octyl hydroperoxide, trans-decalin hydroperoxide, 1--methylycyclopentyl hydroperoxide, 1,1-dimethyl-2-propenyl hydroperoxide, 2-cyclohexene-1-yl hydroperoxide, cumene hydroperoxide, tetralin hydroperoxide, triphenyl methyl hydroperoxide, etc.; peroxides of the formula ROOR′ wherein R and R′, which may or may not be alike can be alkyl such as methyl, ethyl, propyl, butyl, pentyl, hexyl, heptyl, octyl, nonyl, decyl, undecyl, etc.; aralkyl, i.e., benzyl, phenethyl, phenylpropyl, naphthylmethyl, naphthylethyl, naphthylpropyl, etc.; aryl such as phenyl, naphthyl, etc.; aliphatic acyl such as acetyl, propionyl, butyryl, valeryl, etc.; aromatic acyl such as benzoyl, naphthoyl, etc.; peroxy acids, i.e., aliphatic peroxy acids, e.g., peracetic acid, perpropionic acid, perbutyric acid, etc.; aromatic peroxy acids, i.e., perbenzoic acid, perphthalic acid, etc.; esters of the aforesaid peroxy acids; salts of peracids such as ammonium persulfate, etc. Such per-compounds are well known and their description and preparation can be found in the chemical literature. In this connection, reference is made to such well known works as "Organic Peroxides," by Arthur V. Tobolsky and Robert B. Mesrobian and published by Interscience Publishers, Inc., New York, and Interscience Publishers, Ltd., London (1954).

It is again pointed out that the photopolymerization composition generally contains the monomer, triacrylyl-diethylenetriamine, a quantity of ferric salt used to initiate polymerization of the monomer, and a colloidal or similar carrier. The quantity of ferric salt used to initiate polymerization of the monomer is not very critical and can be advantageously varied over varily wide limits. In general, however, it has been found that satisfactory results usually occur if the proportion of ferric ion to monomer varies from 1:10,000 to 1:6.

As indicated above, in most instances when a photographic coating is produced employing the novel monomer and ferric salt, it is desirable to employ a normally solid hydrophilic colloid as a carrier for the light-sensitive ferric compound or a similar carrier material. Thus, for example, suitable colloidal carriers for the purposes of the present invention include such as polyvinylalcohol, casein, glue, saponified cellulose acetate, carboxymethylcellulose, starch, gelatin, and particularly, polyvinyl pyrrolidone and similar polymerized lactams. In this regard, it has been found that polyvinyl pyrrolidone and similar polymerized lactams provide excellent carriers for the light-sensitive ferric compound employed in accordance with the present invention.

The photopolymerization can be carried out under a wide variety of conditions employing numerous modifications. Our system of photopolymerization is particularly valuable in the field of photography where its high speed and response to relatively low or high intensity radiation sources make it ideal for imagewise polymerization.

One valuable application of our process, for example, is the production of relief printing plates for use in the graphic arts. Such plates can be fabricated by coating a mixture of monomer in a suitable solvent plus a small quantity of ferric salt, on a suitable base or support. The resulting coating can then be exposed to a radiation source (such as an incandescent bulb having a tungsten filament) after which it is treated with a per-compound. The exposed areas undergo rapid polymerization in the presence of the irradiated ferric salts, whereas the unexposed areas are left unaffected so that the unreacted or unpolymerized monomers may be washed off or otherwise removed. A resist is thus formed of the photopolymerized polymer which can be used as a negative-working relief plate. By employing a hydrophilic surface as the support for the coating, such as a partially saponified cellulose acetate, a plate is produced having washout-resistant areas. Such a plate can then be transformed by well-known means into a negative-working offset plate.

In the field of photography, our invention can be used, for example, for the production of black and white prints. Thus, a light-sensitive plate is prepared having coated thereon a layer comprising a monomer, a light-sensitive ferric compound and a finely divided black pigment dispersed in the coating. This plate is then exposed beneath a silver negative which causes polymerization in the exposed areas of the coating when processed with a per-compound. After washing with water to remove unpolymerized monomer in the unexposed regions, there is obtained a reversed polymeric photographic image.

Another photographic application of the present invention is in color reproduction. For example, a light-sensitive plate is prepared as described above, i.e., containing the monomer and ferric compound and exposed to one of the primary color aspects of a subject using a color separation negative. After treatment with a per-compound to effect polymerization in the exposed areas, the so-obtained polymerized image is then subtractively dyed. By exposing other light-sensitive plates to the remaining primary color aspects of the subject processing as described above to effect polymerization in the exposed areas, and subsequently dyeing with the appropriate subtractive dye, superimposition of the resulting subtractively colored images will then reproduce the original subject.

Other uses to which the above photopolymers may be put include such photographic and lithographic applications as, for example, in the production of bimetallic printing plates, etched copper halftone images, printing plates having cellulose ester supports, grained zinc or aluminum lithographic plates, zincated lithographic printing plates, ungrained copper printing plates for preproofing copper chromium bimetallic plates, etc.

Numerous materials are suitable as supports or bases for the radiation-sensitive plates prepared in accordance with the process described herein, such as cellulose ester supports including the hydrophobic variety or the type having a surface rendered hydrophilic by a partial saponification, metals such as aluminum or zinc, polyethylene terephthalate polymers, paper, glass, polystyrene, polycarbonates, etc.

It is again pointed out with respect to the photopolymerizable composition and process that the critical feature of the present invention provides in the utilization of the novel polyacrylyl polyethylene polyamine monomers, particularly the novel monomer, triacrylyldiethylenetriamine. In this connection, by employing the monomer triacrylyldiethylenetriamine in the photopolymerization composition it is possible to provide such a composition and a photopolymerizable process wherein the speed of the photopolymerizable process is greatly increased.

The present invention, including the novel monomer of the present invention, method of producing the same, photopolymerization process and composition will now be described by reference to the following specific examples:

EXAMPLE I

A solution of diethylenetriamine, 30.9 g. (~0.3 mole), in 31 ml. deionized water was placed in a 600-ml. beaker in the hood. The beaker was equipped with a mechanical stirrer and a thermometer, and was placed in an ice-ethanol cooling bath. Two dropping funnels were clamped above the beaker, so that their contents could be discharged into the amine solution. In one funnel was placed a solution consisting of sodium hydroxide, 36.0 g. (0.9 mole) in 36 ml. deionized water. The caustic solution was protected from carbon dioxide by means of an Ascarite tube (NaOH- Asbestos $CO_2$ absorbent). In the other funnel was placed a solution of acrylylchloride, 108.6 g. (~1.2 moles), dissolved in 95 ml. methylene chloride. This solution was protected from moisture by means of a calcium chloride drying tube.

Simultaneous dropwise addition of the caustic and of the acryl chloride was carried out over a period of 3½ hours. The temperature of the reaction mixture was maintained at 0° to 10° C. by means of the cooling bath. The relative rates of addition of the two reagents were adjusted so that when all of the sodium hydroxide (0.9 mole) had been added, three-quarters of the acrylyl chloride (three-quarters of 1.2 moles) had also been introduced. After the remainder of the acrylyl chloride had been allowed to drop in, stirring of the mixture was continued for a half hour at 0° to 10° C. The total reaction time therefore was 4 hours.

The viscous reaction solution obtained amounting to about 300 ml. was poured as completely as possible into a 3-liter beaker. Anhydrous acetone, 1,800 ml., was poured into the reaction mixture, causing the precipitation of a stiff white gum; some of the acetone-water supernatant liquid was poured back into the 600-ml. beaker, yielding additional gum. The gummy precipitate represented a mixture of organic and inorganic reaction products. The supernatant acetone-water (containing also methylene chloride) was decanted off and discarded. Since the amorphous reaction product adhered to the walls of the two beakers, filtration of the solids was unnecessary.

Absolute ethanol, 300 ml., was now added to the combined solids. The organic reaction products were thereby dissolved, leaving behind a residue of powdery sodium chloride. The undissolved N,N',N''salt was filtered off on a Buechner funnel, and was washed three times with 50-ml. portions of absolute ethanol. The sodium chloride weighed about 47 grams and the combined alcoholic solution measured about 450 ml. It contained besides the desired reaction product, N,N',N''-triacrylyl diethylenetriamine, smaller quantities of the hydrochlorides of diacrylyl diethylenetriamine, monoacrylyl diethylenetriamine, and diethylenetriamine itself.

The ethanol solution was now evaporated under reduced pressure at the water pump, using a rotary evaporator, the temperature of the water bath used during evaporation being kept below 50° C. In this way a straw-colored semisolid mass was obtained, weighing about 80 grams.

To this jellylike residue there was added deionized water, 100 ml., completely dissolving the solids. The aqueous solution so obtained had a *p*H of less than 1 and gave a strong positive chloride test (silver nitrate). It measured about 190 ml.

A quantity, 250 g., of anion exchange resin, Amberlite (Rohm and Haas) IRaA–401 had previously been converted to the OH form by treatment with sodium hydroxide, 3 N, until the test for chloride was negative. The resin was then washed with deionized water until the wash water was neutral. It was now divided into five batches of about 50 grams each. The aqueous solution of reaction products was now treated in succession with each of the five 50-gram batches of IRA–401. The method of treatment consisted of manually stirring the resin in the aqueous solution for 2 to 3 minutes. This was followed by rapid filtration of the slurry on a Buechner funnel, washing the resin with about 40 ml. deionized water each time. After each resin treatment a qualitative test was made for chloride and *p*H. The chloride test grew weaker each time, and the *p*H measurements read successively about 1, 2, 4, 6 and 11.7. After the aqueous solution had been stirred with the final 50 gram portion of IRA–401, the chloride test became negative, and the *p*H as read on a meter had levelled off at 11.7. The alkaline reading was ascribed to the presence of unreacted and partially acrylated diethylenetriamine.

A quantity, 500 g., of cation exchange resin, Amberlite (Rohm and Haas) IR–120, had meanwhile been washed with 500 ml. deionized water. The washings were slightly acidic. The washed resin was divided into 10 batches of 50 g. each. The alkaline solution (400 ml.), which had been treated with anion exchange resin, was now mixed successively with 50 g. portions of cation exchange resin (manual stirring). After each stirring operation, the resin was filtered and washed with 25 ml. deionized water. The *p*H was found to drop rapidly at first, becoming 7.75 after 300 g. of resin had been used, and gradually reaching a value of 7.05 after treatment with the last 50 g. of resin. The volume of neutral chloride-free aqueous solution of monomer measured about 650 ml. at this point.

The aqueous solution was now evaporated under reduced pressure at the water pump using a rotary evaporator, and taking the precaution that the temperature of the water bath used for evaporation did not exceed 50° C. In this manner the volume of aqueous solution was reduced to 112 ml. The solution was then filtered. Any residue on the filter paper was discarded. To the aqueous filtrate anhydrous acetone was added in an amount of 1,120 ml., resulting in the formation of a white precipitate. The aqueous-acetone supernatant liquid was discarded. The precipitate of product was dissolved in about 750 ml. absolute ethanol and again filtered. Evaporation to dryness was now carefully carried out under reduced pressure at the water pump, using a rotary evaporator. Again, the temperature of the water bath used for evaporation was not allowed to exceed 50° C. A fluffy, granular product was then obtained, having a slightly yellow cast (attributed to traces of IR–120). Analysis of this product, the desired N,N',N''triacrylyl diethylenetriamine, gave the following figures:

| | | | |
|---|---|---|---|
| Calculated: | N, 15.8% | C, 58.8% | H, 7.2% |
| Found: | N, 14.93% | C, 56.65% | H, 7.74% |

The total yield was 29.0 grams or 36.4 percent.

A sample of the product showed no melting point, but appeared to polymerize with heat at about 60° C. The compound was found to be very soluble in water (at least 30 percent by weight), methanol, and ethanol. It is practically insoluble in acetone and ethyl acetate. In spite of its high solubility in water, the compound did not appear to be especially hygroscopic. In aqueous solution the compound begins to polymerize at a *p*H below 3 and above 7.8.

To test the sample as a monomer, a few granules were dissolved in deionized water, 0.5 ml., and a drop of one percent aqueous hydrogen peroxide was added, followed by 0.2 ml. water in which had been dissolved a crystal of ferrous ammonium sulfate. A white opaque polymer formed immediately.

EXAMPLE 2

The process described in example 1 is repeated except that the diethylenetriamine is replaced with substantially equimolar amounts of the following amines, the acrylyl chloride and caustic being employed in molar amounts corresponding to the amine functionality of the amine:

A. triethylene tetraamine
B. tetraethylene pentaamine
C. pentaethylene hexaamine
D. 1,2,3 propane triamine By employing such polyamines the process of the present invention produces substantially equivalent amounts of the corresponding polyacrylyl polyethylene polyamine.

EXAMPLE 3

Examples 1 and 2 are repeated except that the acrylyl chloride is replaced with substantially equimolar amounts of methyacrylyl chloride. Again, substantially equivalent results with respect to yield and purity of the desired polymethacrylyl polyethylene polyamine are obtained.

EXAMPLE 4

The photographic speed of a photopolymerizable composition of triacrylyldiethylenetriamine was compared with that of a composition containing N,N'-methylene bis acrylamide by preparing, exposing, and processing the appropriate formulations. The following light-sensitive solutions were prepared under red safelight:

| | | |
|---|---|---|
| Polyvinyl pyrrolidone, K–90 (GAF) gram. | 1.000 | 1.000. |
| N,N'-methylenebisacrylamide,[1] gram. | 0.250 | None. |
| N,N',N''-triacrylyl diethylenetriamine,[2] gram. | None | 8.0. |
| Acetic acid, 6 normal,[3] milliliter | None required | 3.2 (estimated). |
| Ferric ammonium oxalate trihydrate [4] (formula weight=428) grams. | 0.64 | 2.56. |
| Wetsit spreading agent, 10% aqueous solution, milliliter. | .08 | .08. |
| Water deionized to, milliliter | 25 | 25. |
| Photographic speed, as indicated by the number of steps [5] formed through a $\sqrt{2}$ step wedge. Exposure 15 seconds, 375 watt reflector lamp at 15 inches. | 8 | 20. |
| Photographic speed, as indicated by the number of steps [6] formed through a $\sqrt{2}$ step wedge. Burke-James Solar Enlarger, Model 120, enlargement ratio 1:1. Exposure period 60 seconds. | 0 | 9. |

1. Recrystallized twice from water
2. As prepared in this disclosure
3. In sufficient quantity to bring the *p*H to 4.0 before the addition of ferric ammonium oxalate.
4. Recrystallized three times from water in red safelight, thereby reducing the content of ferrous iron to less than 0.001 percent.
5. Eight steps in 15 seconds corresponds to 12 steps in 60 seconds for the composition MBA - PUP - ferric ammonium oxalate. Increasing the MBA content to 1.000 g. and the ferric ammonium oxalate content to 2.56 g. did not increase the number of polymeric steps observed. Hence, the coating is saturated with respect to MBA.
6. One polymeric step barely evident after an exposure of 4 minutes of the N,N'-methylenebisacrylamide coating.

Procedure: Each solution was poured on to a glass plate which had been appropriately subbed to receive the solution. The coated plate was whirled 5 minutes on an Addressograph-Multigraph coating machine, then allowed to dry in the dark at room temperature for about an hour.

A sample was cut from each plate and exposed through a Graphic Arts step tablet under two different exposure conditions. In one the sample was exposed to the light from a 375-watt reflector lamp for a period of 15 seconds at a distance of 15 inches. In the other exposure condition, the sample was exposed to the light from a Burke James Solar Enlarger Model 120, at an enlargement ratio of 1:1 for a period of 60 seconds. After each exposure, each sample was immersed (under red safelight) in a tray of 1 percent aqueous hydrogen per oxide. During the immersion step the unpolymerized areas dissolved, leaving undissolved a polymeric image of the step tablet. The number of steps observed was recorded in the table above.

Comparison of Photographic Speeds: With the 375-watt lamp exposure the difference in the number of steps observed was twelve. Since a $\sqrt{2}$ step tablet was used, the difference in photographic speeds was $(\sqrt{2})^{12}$ or $2^6$ equal to 64. With the enlarger exposure the number of steps for the triacrylyldiethylenetriamine coating was nine. When this figure is extrapolated to a 4-minute period, it becomes 13. This compares with one step at 4 minutes for the N,N'-methylenebisacrylamine coating and represents a speed difference of 12 steps as with the 375-watt lamp. Again the photographic speed achieved with triacrylyldiethylenetriamine was 64 times that observed with N,N'-methylenebisacrylamine.

Control test with a product of known photographic speed:

A sample of Eastman Kodak High Resolution Glass Plate was given an exposure through the same step wedge for a period of 60 seconds in the Burke James Solar Enlarger, Model 120, at an enlargement ratio of 1:1. The exposed plate was developed and fixed in the manner prescribed for the product. After processing, the number of metallic silver steps observed was 12. The published photographic speed for Eastman Kodak High Resolution Glass Plate is Exposure Index=0.025 (tungsten). The Exposure Index therefore for the triacrylyldiethylenetriamine photopolymerizable composition shown in the table is 0.025 divided by $2\sqrt{2}$, calculated to be 0.009. Greater photographic speeds may be attained with higher concentrations of triacrylyldiethylenetriamine.

EXAMPLE 5

A "control" or "type" coating was prepared by coating on a paper base the following solution:

Gelatin (Iron-free)—grams—5

Water, deionized—milliliters—40

A-5 (approximately 60 percent acrylamide, 2.33 percent N,N'-methylene bis-acrylamide in water)—milliliters 6

Glycerin—drops—0.6 ml.

Ferric ammonium citrate (brown) (36 grams/100 milliliters of deionized water)—milliliters 5

A sample strip was exposed in series through a photoprint negative and through a neutral density filter having an optical density of 1.0 to a 375-watt photoreflector lamp at 16 inches. The exposed coating was processed in a 1percent aqueous solution of hydrogen peroxide and washed with water to remove unpolymerized monomer. The minimum time required to give a photoprint resist was found to be 15 seconds.

EXAMPLE 6

A coating solution was prepared as in example 5 except that the A-5 monomer solution, i.e., acrylylamide and N,N'-methylene bisacrylamide, was replaced with 15 grams of N,N',N''triacrylyldiethylenetriamine. The *p*H was adjusted to 4.0 with 6N acetic acid. The total volume was brought to 50 ml. with deionized water. Gelatin was iron free.

When such a preparation had been coated on a paper base and dried, a sample strip was exposed and processed in the manner described for the "control" coating, as shown in example 5. When employing the monomer N,N',N''-triacrylyldiethylenetriamine, the minimum time required to give a photoprint resist was reduced from the 15 seconds through a neutral density 1.0 filter of example 5 to a period of only 3 seconds through a neutral density 2.0 filter. This, therefore, shown the speed is increased when using the novel monomer of the invention by a factor of 50 in this example.

Iron-free gelatin was used in examples 5 and 6 so as to prevent the formation of background polymer.

What is claimed is:

1. In a photopolymerizable composition—capable of producing an image after exposure to light and treatment with a per-compound—comprising a photopolymerizable monomer, radiation-sensitive ferric compound, and a colloidal carrier, the improvement which comprises increasing the speed of the photopolymerizable composition by employing as said photopolymerizable monomer N,N',N''-triacryldiethylenetriamine.

2. The photopolymerizable composition of claim 1 wherein said per-compound is a peroxide.

3. The photopolymerizable composition of claim 1 wherein said colloidal carrier is polyvinylpyrrolidone.

4. A photopolymerizable coating composition of increased photopolymerization speed comprising a polyvinylpyrroldone carrier containing a radiation-sensitive ferric compound and a polymerizable monomer comprising N,N'''triacrylyldiethylenetriamine, the ratio of the ferric ion to monomer being from 1:10,000 to 1:6.

5. A photopolymerizable element comprising an image receptive support coated with the composition of claim 4.

6. A process of producing a polymeric photographic image which comprises irradiating to light, a coating of a colloidal carrier containing, as the photopolymerizable monomer, N,N'''-triacrylyldiethylenetriamine, and a radiation-sensitive ferric salt designed to produce ferrous ions imagewise by such irradiation and treating the irradiated coating with a per-compound to provide for the conjoint presence imagewise in said coating of said monomer, ferrous ions, and per-compound, to thereby cause imagewise polymerization of said monomer.

7. The process of claim 6 wherein said colloidal carrier is polyvinylpyrrolidone.

8. The process of claim 6 wherein said per-compound is a peroxide.

9. The process of claim 8 wherein said peroxide is present as an aqueous solution.